US009108224B2

(12) United States Patent
Schererz et al.

(10) Patent No.: US 9,108,224 B2
(45) Date of Patent: Aug. 18, 2015

(54) SORTING INSTALLATION AND SORTING METHOD FOR JOINTLY SORTING DIFFERENT KINDS OF ARTICLES

(75) Inventors: Holger Schererz, Rehfelde (DE); Rolf-Peter Skrdlant, Ueberlingen (DE); Frank Voss, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/347,720

(22) PCT Filed: Sep. 13, 2012

(86) PCT No.: PCT/EP2012/067943
§ 371 (c)(1),
(2), (4) Date: Mar. 27, 2014

(87) PCT Pub. No.: WO2013/045279
PCT Pub. Date: Apr. 4, 2013

(65) Prior Publication Data

US 2014/0236345 A1 Aug. 21, 2014

(30) Foreign Application Priority Data

Sep. 28, 2011 (DE) ......................... 10 2011 083 580

(51) Int. Cl.

| | |
|---|---|
| ***G06F 7/00*** | (2006.01) |
| ***B07C 3/00*** | (2006.01) |
| ***B07C 1/10*** | (2006.01) |
| ***B07C 1/14*** | (2006.01) |

(52) U.S. Cl.
CPC ... *B07C 3/00* (2013.01); *B07C 1/10* (2013.01); *B07C 1/14* (2013.01)

(58) Field of Classification Search
None
See application file for complete search history.

(56) References Cited

U.S. PATENT DOCUMENTS

| | | | | |
|---|---|---|---|---|
| 5,433,325 | A | 7/1995 | Levaro et al. | |
| 5,959,288 | A | 9/1999 | Tajiri et al. | |
| 7,624,854 | B2 | 12/2009 | Zimmermann et al. | |
| 7,987,780 | B2 | 8/2011 | Teluob et al. | |
| 2004/0218958 | A1 | 11/2004 | Kruger et al. | |
| 2009/0166270 | A1 * | 7/2009 | Sato | 209/576 |
| 2010/0231626 | A1 | 9/2010 | Teluob et al. | |
| 2014/0284254 | A1 * | 9/2014 | Berdelle-Hilge | 209/552 |

FOREIGN PATENT DOCUMENTS

| | | | |
|---|---|---|---|
| DE | 3821106 | A1 | 1/1989 |
| DE | 10146842 | A1 | 4/2003 |

(Continued)

*Primary Examiner* — Yolanda Cumbess
(74) *Attorney, Agent, or Firm* — Laurence A. Greenberg; Werner H. Stemer; Ralph E. Locher

(57) ABSTRACT

A sorting installation and a sorting method jointly sort two kinds of flat mail items. For each article to be sorted, a value that a prescribed sorting feature assumes for the article is measured. The article is transported by a first transport device to a separating filter. An article of the first article kind is redirected in a first outward-transfer device. On the basis of the ascertained sorting feature value, one sorting output from a first set of sorting outputs is selected. The article is transferred outward to the selected sorting output from the first sorting output set. An article of the second article kind is redirected to a second transport device and transported to a second outward-transfer device. On the basis of the ascertained sorting feature value, one sorting output from a second set of sorting outputs is selected.

13 Claims, 1 Drawing Sheet

(56) References Cited

FOREIGN PATENT DOCUMENTS

| | | | |
|---|---|---|---|
| DE | 102008056904 | A1 | 4/2010 |
| DE | 102011076909 | A1 | 2/2012 |
| EP | 0654309 | B1 | 9/1999 |
| EP | 1872867 | A1 | 1/2008 |
| EP | 2077162 | A1 | 7/2009 |
| FR | 2915013 | A1 | 10/2008 |

* cited by examiner

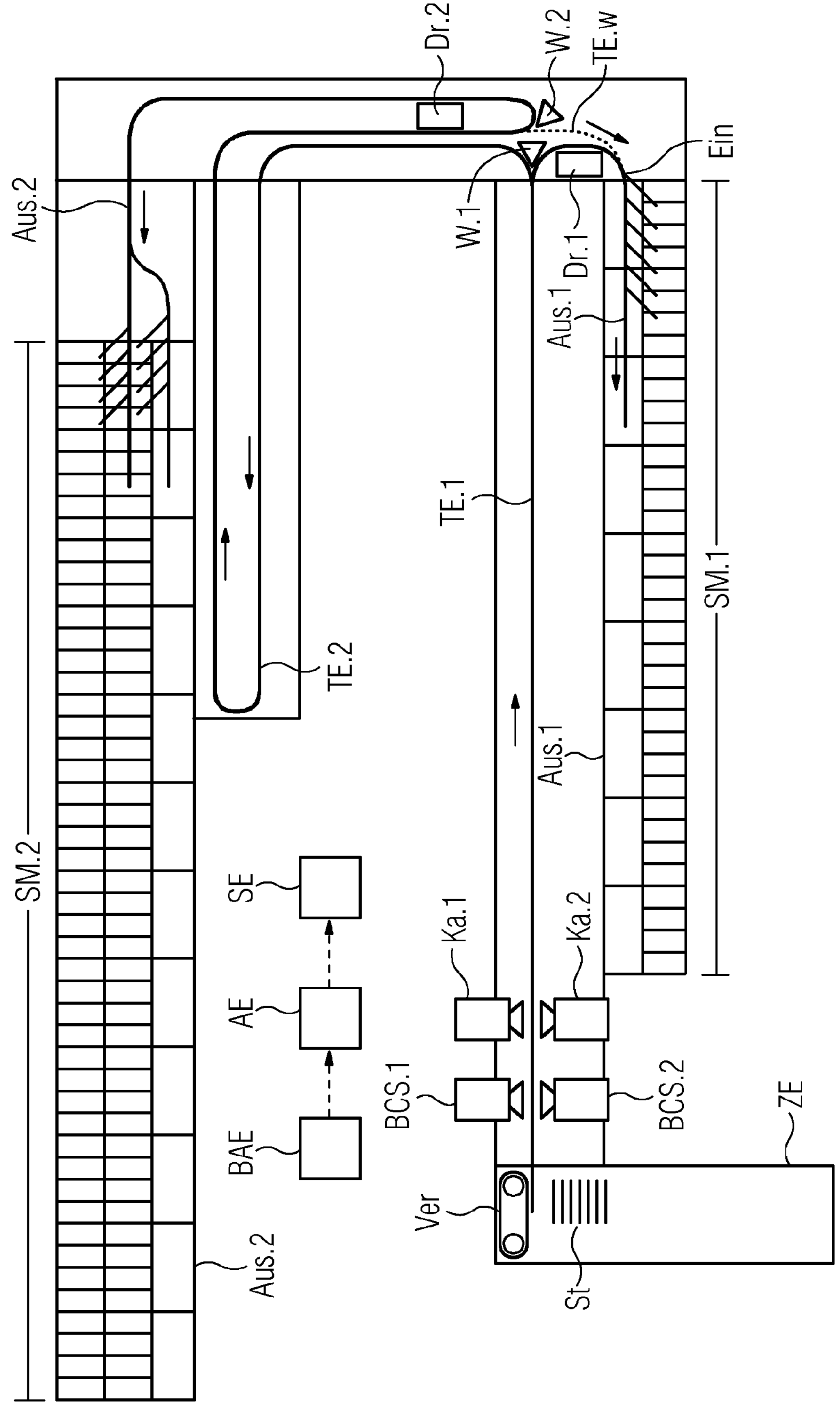
Dr.2
W.2
TE.w
Ein
Aus.2
W.1
Dr.1
Aus.1
TE.1
SM.1
TE.2
Aus.1
SM.2
SE
AE
BAE
Ka.1
Ka.2
BCS.1
BCS.2
ZE
Ver
St
Aus.2

SORTING INSTALLATION AND SORTING METHOD FOR JOINTLY SORTING DIFFERENT KINDS OF ARTICLES

BACKGROUND OF THE INVENTION

Field of the Invention

A method and an apparatus for processing articles, in particular flat mail items, are described in the subsequently published DE 102011076909 A1. For each article, the value assumed by a prescribed sorting feature for this article is measured. It is decided whether the article belongs to a first article kind or to a second article kind. A first outward-transfer device transfers each article of the first article kind to a sorting output of the first set of sorting outputs. An article of the second article kind is transported past the first outward-transfer device and onwards to a second outward-transfer device. The second outward-transfer device transfers the article to a sorting output of a second set of sorting outputs. An image of an article of the second article kind is analyzed in order to decode a character string on the surface thereof, e.g. an identification mark of a destination address for a mail item. An article of the first article kind is brought into a prescribed orientation.

DE 10146842 A1 describes a method and an apparatus for imprinting flat mail items. FIG. 1 shows the transport of a mail item 10 from right to left. A first camera 30 captures graphical properties of a surface of the mail item 10. For example, an image of a postage stamp is compared with reference images in a postage stamp database. Undersized mail items are transferred out. A mail item 10 can be rotated and/or turned over by a rotating device 40. A second camera 50 captures positions of graphical elements on the surface of the mail item 10. A printing device 60 imprints the mail item 10, using measurement results from the second camera 50 in order to position the imprint. Finally, the mail item is forwarded in one of the directions "reject", large letter ("GBf-Maxi") or small letter ("KBf"); cf. FIG. 1.

EP 1872867 A1 describes a sorting installation 2 for sorting flat mail items. A presorting device 4 sorts out all mail items 24 which are not standard letters. A singulator 6 singulates the mail items, such that the mail items 24 pass through the sorting installation 2 separately and in an upright position. A transport train 26 comprising two drives 44, 54 transports the mail items to an alignment unit 10 which aligns the upright mail items 24 at their lower edges, and then to a scanner 30. This scanner 30 reads the address and/or a barcode on the mail item 24. An image recording device 32 generates a computer-accessible image of both surfaces of the mail item 24. In a first operating mode of the installation, the mail items 24 are then directed into a transport train section 36. This transport train section 36 leads to an alignment facility 12 which ensures that mail items 24 are uniformly oriented, e.g. such that the stamp is arranged at the front and foremost. A module 14 cancels the stamp. All mail items 24 are carried via a transport train 26 to a transport delay section 16 of approximately 50 m in length, along which the mail items are transported in order that sufficient time remains for decoding the address on the mail item. A module 18 prints a barcode on mail items 24 having addresses which are not completely machine-readable. A module 20 prints an adhesive label stating a forwarding address if required. An allocation apparatus 22 distributes the mail items 24 to containers according to their addresses, e.g. 100 postcodes per container.

In a further operating mode of the installation according to EP 1872867 A1, preprepared mail items 24 are supplied by means of a second singulator 8 of the sorting installation 2.

These preprepared mail items are already uniformly aligned and have a payment stamp in each case. These prepared mail items 24 are therefore redirected by means of a separating filter 34 into a bypass 36 having a transport train section 38. This bypass 36 leads past the transport train section 42 comprising the modules 12, 14 and joins the transport train 26 again upstream of the transport delay section 16. In an embodiment variant, provision is made for two sorting runs to take place. In the second sorting run, the mail items 24 are returned uniformly aligned and oriented to the sorting installation 2. In the second sorting run, the mail items 24 are therefore routed by means of a second separating filter 46 to a second bypass 48 having a transport train section 50. This transport train section 50 leads from the scanner 30 directly to the allocation device 22.

DE 3821106 A1 describes an apparatus which is able to turn over and stamp mail items. The mail items 1 are taken from a magazine 6 by means of a feeding device 7 and passed horizontally in front of detectors 9*a*, 9*b* which respectively scan the upper and lower sides of a mail item 1. A separating filter 10 directs a mail item 1 either onto a track 12 where the mail item is turned over, or onto a track 11 where the mail item 1 is not turned over. The tracks 11, 12 join a track 13, on which the mail item 1 is passed in front of a stamping unit 14 comprising two stamping devices 14*a*, 14*b*. The stamped mail items 1 are distributed by means of a separating filter 15 onto two stacking devices 16*a*, 16*b*. The detector 9 detects the position and the text orientation of address blocks. The mail items are turned over or not turned over as a function of the position of the address blocks, and are allocated to the two stacking devices 16*a*, 16*b* as a function of said position.

DE 10 2008 056 904 A1 describes a method and an apparatus for imprinting a mail item. Each mail item to be imprinted is clamped by a conveyor device in an upright position between two continuous conveyor belts 3, 4. Consequently, an upper region on the surface of the mail item above the continuous conveyor belts 3, 4 and a lower region below the continuous conveyor belts 3, 4 remain free. A first printer 1 is able to stamp an imprint on the upper region of the surface, and a second printer 2 an imprint on the lower region. The mail item can therefore be furnished with two imprints at different positions in a single transport operation.

FR 2915013 A1 and US 2010/0231626 A1 describe an apparatus for canceling mail items ("appareil d'obliteration"). A mail item is imprinted while being transported in an upright manner. FIG. 2 shows an arrangement comprising a plurality of conveyor belts ("courroies 5A, 5D") arranged one above the other, defining four strip-like free zones 9A to 9B. Four print heads ("tête d'impression 6A-6D") are able to stamp imprints in these free zones 9A-9D. A camera ("caméra numérique 3") records an image before the imprinting, and a sensor ("capteur de passage 4") records an image of the mail item.

EP 0654309 B1 describes a "mail accumulating device". This apparatus pushes mail items together in such a way that the mail items at least partly overlap.

U.S. Pat. No. 5,959,288 describes a sorting installation which is able to sort mail items of different sizes. These mail items pass through the sorting installation as a series of separate mail items. The sorting installation distributes the mail items to different output units.

BRIEF SUMMARY OF THE INVENTION

The object of the invention is to provide a sorting installation and a sorting method for jointly sorting two kinds of articles according to a sorting feature, wherein the respective sorting feature value is identified in timely fashion for as many articles as possible and moreover the danger of damage caused by the transport is reduced.

The claimed sorting installation sorts articles of a first article kind together with articles of a second article kind according to a prescribed sorting feature. The articles of the second article kind differ by virtue of at least one physical parameter from the articles of the first article kind, e.g. in that the value of the parameter lies in a prescribed value range for every article of the second article kind, but not for an article of the first article kind. This parameter is not usually the sorting feature. The parameter is e.g. a dimension, the weight, a surface condition or the flexural stiffness of an article to be sorted. The sorting step comprises the operation whereby the articles to be sorted are allocated to the sorting outputs as a function of their sorting feature values.

The claimed sorting installation comprises

- a first transport device, which is able to transport both all articles to be sorted belonging to the first article kind, and articles belonging to the second article kind,
- a second transport device, which is able to transport articles belonging to the second article kind, but not necessarily also all articles to be sorted belonging to the first article kind,
- a separating filter comprising at least one input and at least two outputs,
- a first set of sorting outputs, each of which is able to accommodate at least one article of the first article kind,
- a second set of sorting outputs, each of which is able to accommodate at least one article of the second article kind,
- a first outward-transfer device, which is able to transfer articles of the first article kind out into the sorting outputs of the first set of sorting outputs,
- a second outward-transfer device, which is able to transfer articles of the second article kind out into the sorting outputs of the second set of sorting outputs, and
- a measuring device, which is able to measure or otherwise determine the value assumed by the prescribed sorting feature for an article to be sorted.

The first transport device leads to the input of the separating filter. The first outward-transfer device starts at one output of the separating filter. The second transport device starts at the other output of the separating filter. The second transport device flows into the second outward-transfer device.

The following steps are performed for each article to be sorted, after the article has been fed into the sorting installation:

- The measuring device determines the value assumed by the prescribed sorting feature for this article.
- The measuring device determines whether the article belongs to the first article kind or to the second article kind.
- The first transport device transports the article to the separating filter.

The sorting installation is so designed that, when an article to be sorted reaches the separating filter, it is known whether this article belongs to the first article kind or to the second article kind.

The following steps are performed for each article of the first article kind:

- The separating filter directs the article into the first outward-transfer device.
- The first outward-transfer device transports the article onwards.

If the measuring device has determined the sorting feature value of this article of the first article kind in timely fashion, the following steps are then performed:

- The selection unit automatically selects a sorting output of the first set of sorting outputs, specifically as a function of the determined sorting feature value of this article.
- The first outward-transfer device transfers the article out into the selected sorting output.

The following steps are performed for each article of the second article kind:

- The separating filter directs the article into the second transport device.
- The second transport device transports the article onwards, to the second outward-transfer device in this case.

If the measuring device has determined the sorting feature value of this article of the second article kind in timely fashion, the following steps are then performed:

- A sorting output is selected automatically, specifically as a function of the determined sorting feature value.
- If the selected sorting output belongs to the second set of sorting outputs, the second transport device transports the article to the second outward-transfer device, and the second outward-transfer device transfers the article out into the selected sorting output of the second set of sorting outputs.

An article of the first article kind is transported through the first transport device to the first outward-transfer device and transferred out by the first outward-transfer device. An article of the second article kind is transported by the first transport device and then by the second transport device to the second outward-transfer device, or at least over part of the second transport device. Therefore an article of the second article kind is always transported over a greater distance than an article of the first article kind.

This extended transport holds an increased danger that the article will be damaged as a result of the transport while it is being transported en route to the selected sorting output. In consideration of this, the invention allows the article kinds to be defined in such a way that sensitive (e.g. larger) articles belong to the first article kind and are only transported over a shorter distance, while less sensitive articles belong to the second article kind and can be transported over a greater distance without being damaged.

By virtue of an article of the second article kind being transported over a greater distance than an article of the first article kind, more time is available in which the measuring device is able to determine the sorting feature value of this article of the second article kind. The knowledge of the sorting feature value is required in order to select a sorting output. The scenario in which the measuring device is not able to ascertain the sorting feature value in timely fashion therefore occurs more rarely or not at all. The sorting feature value is required in timely fashion in order that the respective outward-transfer device can transfer the article out into the selected sorting output.

The invention ensures that every transport device and every outward-transfer device can transport the articles in the same transport direction at all times and does not have to implement e.g. a reversal of direction if a sorting feature value is not available in timely fashion. Such a reversal of direction would result in considerable mechanical stress for an article to be sorted and often significantly reduces the throughput.

The following design parameters can be modified in order to adapt the claimed sorting installation to the requirements at the time:

- the arrangement and embodiment of those components of the sorting installation which stipulate when a sorting feature value has been determined in timely fashion and when it has not,
- the number and the arrangement of sorting outputs of the first set of sorting outputs,
- the number and the arrangement of the sorting outputs of the second set of sorting outputs,
- the length and transport speed of the first transport device,
- the length and the transport speed of the second transport device.

The invention allows articles of the first article kind to be sorted according to a first sorting program and articles of the second article kind to be sorted according to a second sorting program, both sorting operations being so performed as to overlap temporally or even being performed concurrently in the claimed sorting installation. Each sorting program uses a respective sorting plan, which assigns a respective sorting output to each sorting feature value that occurs.

In an embodiment variant, a first time span is prescribed or determined as a maximum that is to elapse between the following two events:

- The measuring device has determined the value assumed by the sorting feature for an article to be sorted belonging to the first article kind.
- The first outward-transfer device is in an operating state in which the first outward-transfer device transfers this article out into the selected sorting output, the selection of the sorting output being dependent on the determined sorting feature value. In order to switch the first outward-transfer device into this operating state, an outward-transfer separating filter is set to the correct position, for example.

A second maximal time span for articles of the second article kind and for the second outward-transfer device is prescribed or determined correspondingly.

In this embodiment variant, the measuring device has determined the sorting feature value of an article of the first article kind in timely fashion if, after the time point at which said value has been determined by the measuring device, at least the first maximal time span is still available for the purpose of switching the first outward-transfer device into the outward-transfer operating state in relation to the selected sorting output. The measuring device therefore has at its disposal the entire time span that is required in order to transport the article along the first transport device to the separating filter, plus the outward-transfer time span which is required by the first outward-transfer device in order to transport the article to the selected sorting output, minus the first maximal time span. The outward-transfer time span may differ from sorting output to sorting output.

The measuring device has determined the sorting feature value of an article of the second article kind in timely fashion if, after the time point at which said value has been determined by the measuring device, at least the second maximal time span is still available for the purpose of switching the second outward-transfer device into the outward-transfer operating state in relation to the selected sorting output of the second set of sorting outputs. The measuring device therefore has at its disposal the entire time span that is required in order to transport the article along the first transport device to the separating filter and then along the second transport device to the second outward-transfer device, plus the outward-transfer time span which is required by the second outward-transfer device in order to transport the article to the selected sorting output, minus the second maximal time span. This outward-transfer time span may likewise differ from sorting output to sorting output.

In a further embodiment variant, the measuring device has only determined the sorting feature value of an article of the first article kind in timely fashion if said determination is complete at the latest when the article reaches the first outward-transfer device. Correspondingly, the measuring device in this embodiment variant has only determined the sorting feature value of an article of the second article kind in timely fashion if said determination is complete at the latest when the article reaches the second outward-transfer device.

In an embodiment variant, individual or even all sorting outputs of the first set of sorting outputs are able to accommodate both articles of the first article kind and articles of the second article kind. For example, the sorting outputs of the first set of sorting outputs are larger than the sorting outputs of the second set of sorting outputs, and the articles of the second article kind are smaller than the articles of the first article kind. The second set of sorting outputs comprises more sorting outputs than the first set of sorting outputs. This embodiment variant is advantageous in particular if the sorting installation normally has to sort more articles of the second article kind than articles of the first article kind. This embodiment variant having different quantities and different sizes of sorting outputs saves space and sorting runs.

In a development of this embodiment variant, the sorting installation comprises a further transport device. This further transport device is able to transport articles to be sorted belonging to the second article kind back from the second transport device, or from the second outward-transfer device, to the first outward-transfer device. It is therefore also possible for an article of the second article kind to be transferred to the first outward-transfer device and into a previously selected sorting output of the first set of sorting outputs. This embodiment variant is advantageous, for example, if individual sorting outputs of the second set of sorting outputs are temporarily unavailable. This embodiment variant also allows for only specific sorting feature values to be assigned a sorting output of the second set of sorting outputs in each case, while other sorting feature values are assigned exclusively a sorting output of the first set of sorting outputs in each case. This embodiment variant therefore reduces the required number of sorting outputs of the second set of sorting outputs. In particular, this embodiment variant is advantageous if some sorting feature values are only assumed by a few articles of the second article kind in each case.

In an embodiment variant, the sorting installation has at least one identification marking device, e.g. a printer or labeler. This identification marking device is able to furnish an article to be sorted with an identification mark relating to the determined sorting feature value, e.g. in the form of a barcode. Alternatively, the identification marking device furnishes the article with a unique identifier (ID code). In an embodiment variant, the sorting installation has a single identification marking device for both article kinds. This identification marking device is then arranged upstream of the separating filter in order that articles of both article kinds can be imprinted.

In a further embodiment variant, the sorting installation has a first identification marking device for articles of the first article kind and a second identification marking device for articles of the second article kind. The identification marking device for articles of the first article kind is preferably arranged in or at the first outward-transfer device. The identification marking device for articles of the second article kind is preferably arranged in or at the second transport device or in or at the second outward-transfer device.

In both embodiment variants, the or each identification marking device is only able to furnish an article to be sorted with an identification mark relating to the measured sorting feature value if said sorting feature value has been determined when the article, during the course of its transport, reaches an identification marking position at which the identification marking device can furnish the article with the identification mark. In this embodiment variant, therefore, the sorting feature value of an article to be sorted is only considered to have been determined in timely fashion by the measuring device if the sorting feature value is available as soon as the article reaches the identification marking position.

In an embodiment variant, the sorting installation has at least one special sorting output. An article to be sorted may be transferred out into a first special sorting output by the first outward-transfer device or into a second special sorting output by the second outward-transfer device. Alternatively, the sorting installation may have just one special sorting output for both article kinds, and additionally have a further transport device which leads from the second transport device to the first outward-transfer device.

An article is transferred out into a special sorting output if its sorting feature value has not been determined in timely fashion. In the embodiment variant described immediately above and comprising the at least one identification marking device for the sorting feature value, the sorting feature value is considered to have been determined in timely fashion if the sorting feature value is available at the latest when the article is in a identification marking position and can be furnished with an identification mark by the identification marking device. Otherwise, the article is transferred out into a special sorting output.

In a combination of these two embodiment variants, the or an identification marking device furnishes an article with a unique identifier if the sorting feature value has not been determined in timely fashion, i.e. is not available when the identification marking position is reached. The identifier is therefore unique, while the identification mark of the determined sorting feature value is not unique because a plurality of articles to be sorted can have the same sorting feature value. The sorting feature value of the article which has been transferred out is determined “off-line” while the article is held in temporary storage. The determined sorting feature value is stored in connection with the unique identifier. The article is fed back into the claimed sorting installation again at a subsequent time point. The unique identifier is read and the stored sorting feature value is used as the sorting feature value of this article. The article having the unique identifier is preferably sorted jointly with other articles whose sorting feature values have not yet been determined.

In a preferred embodiment variant, a sequence is prescribed in respect of the sorting feature values, e.g. in respect of at least those values which are actually assumed respectively by at least one article to be sorted. The articles of the first article kind are sorted according to this sequence. A series of articles of the first article kind is produced in each sorting output of the first set of sorting outputs. The respective series of the articles in each sorting output is produced in accordance with the prescribed value sequence. The allocation of the articles to the sorting outputs likewise depends on the prescribed sequence, a prescribed series of the sorting outputs of the first set of sorting outputs likewise being used for this purpose.

Provision is preferably made for a plurality of sorting runs to be performed for the articles of the first article kind. As a result, the sorting installation requires fewer sorting outputs for articles to be sorted belonging to the first article kind than there are different sorting feature values associated with these articles. By virtue of fewer sorting outputs being required, the sorting installation can be smaller in design and therefore require less floor space (“footprint”).

Provision may be made for the articles of the second article kind likewise to be sorted in two sorting runs according to this value sequence. However, provision may also be made for breaking down the possible sorting feature values into groups, such that each group consists of at least one sorting feature value. Each group is assigned at least one sorting output of the second set of sorting outputs. In a sorting run, the articles of the second article kind are so distributed to the sorting outputs of the second set of sorting outputs that each article is transferred out into that sorting output which is assigned to the sorting feature value or group relating to this article.

In an embodiment variant, the same measuring device is able to determine, for both an article of the first article kind and an article of the second article kind, which value the sorting feature assumes for this article. In a further embodiment variant, a first measuring device returns the sorting feature value which has been determined for at least each article of the first article kind. A second measuring device returns the determined sorting feature value for at least each article of the second article kind. The determination results of both measuring devices are used to form a sorting feature value which has been respectively determined for each article.

In an embodiment variant, a further transport device leads from the second transport device to a joining point in the first outward-transfer device. Articles of the second article kind can be transported to the first outward-transfer device via this further transport device.

In a development of this embodiment variant, the articles to be sorted are first allocated into articles of the first article kind and articles of the second article kind. The sorting installation therefore sorts all articles of one article kind first, followed by all articles of the other article kind, i.e. not a mixture of the articles. This embodiment variant comprising the allocation of articles removes the need for articles of two article kinds to be combined in a controlled manner at the joining point (“merging”).

In an embodiment variant, both the first transport device and the second transport device transport the articles to be sorted in such a way that each article is firmly held at all times during transport. During the sorting process, it is therefore possible to predict at any time point and for any article the location in the sorting installation at which this article is situated at this time point. A series of continuous conveyor belts, for example, transports the articles without any points of slippage.

In an embodiment variant, each article to be sorted extends in a respective article plane. Each article is transported in an upright position, i.e. in a vertical article plane. At any time point during the transport, the article is clamped between and transported by two continuous conveyor belts.

In an embodiment variant, each article to be sorted is furnished with characters. The step of determining the sorting feature value of an article to be sorted comprises the step of determining at least some of these characters. The characters on an article identify e.g. a destination to which the article must be transported, describe a property of this article, or jointly form an identifier of an article.

In a further embodiment variant, a plurality of classes of articles are prescribed. Each class is a sorting feature value.

The step of determining the sorting feature value of an article to be sorted comprises the step of determining the class to which this article belongs.

BRIEF DESCRIPTION OF THE SEVERAL VIEWS OF THE DRAWING

FIG. 1 schematically shows the sorting installation of the exemplary embodiment in plan view.

DESCRIPTION OF THE INVENTION

In the exemplary embodiment, the invention is used to sort flat mail items (standard letters, large letters, magazines, and possibly small flat parcels). Each mail item may be furnished with an identification mark of the destination to which this mail item must be transported. This identification mark comprises e.g. the name of a recipient and a postal address (street and house number, or PO box number for letters or parcels, and postcode or ZIP code and location) or a definition of a location on the surface of the earth as specified by geo-coordinates. However, it is also possible for a plurality of similar and unaddressed mail items to be transported or transferred with an address list to a sorting installation, and for the sorting installation to imprint each as yet unaddressed mail item with an address from the address list in each case.

Each mail item extends in an article plane and has a length, a height and a thickness. The thickness is the dimension perpendicular to the article plane.

In the exemplary embodiment, a distinction is made between two kinds of mail items, namely standard letters (in the USA: "letters") and large letters (in the USA: "flats"). The large letters represent the articles to be sorted belonging to the first article kind, while the standard letters represent the articles to be sorted belonging to the second article kind. If the maximal dimension of an article is less than a length limit, the thickness is less than a thickness limit and, in an embodiment variant, the weight is less than a weight limit, a mail item is processed as a standard letter, otherwise it is processed as a large letter.

The sorting installation in the exemplary embodiment comprises the following components, which are schematically shown in FIG. 1:

- at least one feeder device ZE having a singulator Ver,
- two barcode scanners BCS.1, BCS.2,
- two cameras Ka.1, Ka.2,
- a data-processing image analysis unit (BAE),
- a system of transport devices comprising a first transport device TE.1, a second transport device TE.2 and a further transport device TE.w,
- a first outward-transfer device Aus.1 for large letters,
- a second outward-transfer device Aus.2 for standard letters,
- a set SM.1 of large-letter sorting outputs,
- a set SM.2 of standard-letter sorting outputs,
- a standard-letter printer Dr.2,
- a large-letter printer Dr.1,
- a data-processing selection unit AE,
- a data-processing control unit SE,
- a large-letter special sorting output (not shown),
- in an embodiment variant: a standard-letter special sorting output (not shown).

A plurality of arrows in FIG. 1 indicate the respective transport direction in which mail items are transported by a component of the sorting installation. In the exemplary embodiment, the two transport devices TE.1, TE.2, the further transport device TE.w and the two outward-transfer devices Aus.1, Aus.2 always transport the currently supplied mail items in the same transport direction. In the exemplary embodiment, each mail item is transported upright without slippage and is clamped in this case between two continuous conveyor belts at all times. The mail items are therefore transported by means of a pinch belt conveyor system.

A stack St of mail items is placed in the feeder device ZE. The singulator Ver singulates the flat mail items from the stack St. A stream of mail items transported in an upright orientation emerges from the singulator Ver such that an interval (gap) occurs between two consecutive mail items and the longitudinal axis of the mail item is horizontal.

In an embodiment variant, the sorting installation has a universal feeder device ZE comprising a universal singulator Ver, which is able to singulate the two kinds of mail items. FIG. 1 shows this embodiment. In a further embodiment variant, two different feeder devices work in parallel. A standard-letter feeder device is able to singulate standard letters at a faster rate but consequently cannot singulate large letters at all. A large-letter feeder device is able to singulate large letters and standard letters, but at a slower rate.

The two barcode scanners BCS.1, BCS.2 check whether a mail item has already been furnished with a barcode. This barcode was stamped as part of a previous sorting operation. Such a barcode is either an encoding of a sorting feature value (a destination identification mark in this case) or an encoding of a unique identifier for the mail item. If a barcode is present, said barcode is decoded. A decoded encoding of a destination identification mark gives the sorting feature value. The sorting feature value is therefore determined and is not determined again. This sorting feature value as determined by means of the decoding is subsequently used during the course of the sorting. If the mail item is furnished with a unique identifier, however, this means that the sorting feature value was previously determined "off-line" and that the mail item is passing through the sorting installation again. The unique identifier is stored in a data store in connection with the sorting feature value that was determined. A search request including the unique identifier is submitted to this database. The stored sorting feature value is returned in response to the search request. This returned sorting feature value is used as the sorting feature value of the mail item during the subsequent sorting.

Each mail item is transported in an upright manner between the two cameras Ka.1, Ka.2. The cameras Ka.1, Ka.2 generate a computer-analyzable image of each surface of the flat mail item. One of these images shows the destination identification mark of the mail item. The image analysis unit BAE first tries to decode this destination identification mark automatically by means of optical character recognition (OCR). This automatic determination requires computing time. If this does not succeed, an attempt is made to decode the destination identification mark by means of "video coding". That image of the mail item which shows the destination identification mark is depicted on a visual display unit. An operator reads the destination identification mark in the image that is displayed and enters at least part of said identification mark into a data capture device, e.g. via a keyboard or voice input. In an embodiment variant, on the basis of said input, the image analysis unit BAE then attempts to decode the address automatically and fully by means of OCR in a second attempt (OCR retry).

A distinction is made between "on-line video coding" and "off-line video coding". In the case of "on-line video coding", the mail item remains in the system of transport devices while the destination identification mark is read and entered. Provision is preferably made for the mail item to be so transported as to be firmly held at all times during the time period of the capture, such that the current location of the mail item is known at all times and therefore the result of the capture can be assigned to the correct mail item. It is not absolutely necessarily to furnish the mail item with an individual identifier.

If a capture has not succeeded by a prescribed time point, the mail item is transferred out and therefore removed from the processing operation. Only after the destination identification mark of the temporarily stored mail item has been decoded is the mail item transferred back into the processing operation, specifically by means of the feeder device ZE. This procedure is called "off-line video coding".

The image analysis unit BAE also establishes whether a mail item is a standard letter or a large letter. To this end, the image analysis unit BAE analyzes an image of the mail item and determines the length and the height of the mail item. Provision may also be made for the mail item to be weighed and for the decision to depend additionally on the weight. In an embodiment variant, provision is also made for measuring the thickness of each mail item. The physical parameters that are actually measured depend on the definition of a standard letter and on the actual embodiment of the sorting installation and in particular the sorting outputs. The cameras Ka.1, Ka.2 are arranged downstream of the feeder device ZE, such that the image analysis unit BAE analyzes images of singulated mail items, this providing far better results than can be obtained in the case of stacked mail items. In any case, by the time the mail item reaches the separating filter W.1, it will have been established whether a mail item is a large letter or a standard letter.

The embodiment variant comprising two opposing cameras Ka.1, Ka.2 removes the need for prior orientation of the mail items to be sorted. That surface of the upright transported mail item which shows the destination identification mark may face left or right when viewed in the direction of transport. In a modification, one of the cameras is omitted. The sorting installation therefore has only a single camera. This means that the mail items must be oriented in advance, such that the surface containing the destination identification mark faces this one single camera at all times.

For each mail item to be sorted, the selection unit AE automatically selects a sorting output as a function of the sorting feature value that has been determined (the destination identification mark in this case). The selection of a sorting output for a mail item presupposes that the sorting feature value (destination identification mark in this case) of the mail item has been determined. The selection unit AE uses a computer-analyzable sorting plan, which assigns a sorting output to each sorting feature value that occurs. If the mail item is a standard letter, the selection unit AE selects a standard-letter sorting output, and otherwise selects a large-letter sorting output. Exceptions are described. In an embodiment variant, the selection unit AE uses a standard-letter sorting plan for standard letters and a large-letter sorting plan for large letters. The standard-letter sorting plan assigns a sorting output from the standard-letter set of sorting outputs SM.2 to each sorting feature value that occurs, and the large-letter sorting plan assigns a sorting output from the large-letter set of sorting outputs SM.1.

If the destination identification mark could not be determined in timely fashion, the selection unit AE selects a special sorting output. In an embodiment variant, incorrectly oriented mail items are transferred out, oriented correctly and fed back in again using the correct orientation.

In the exemplary embodiment, the standard-letter sorting outputs are distributed over two levels. Approximately 60 to 80 standard-letter sorting outputs are arranged on each level, and therefore the sorting installation has approximately 120 to 160 standard-letter sorting outputs in total. Each standard-letter sorting output is designed as a compartment and is able to accommodate a stack of upright standard letters. This stack grows with each additional standard letter which is transferred out. The standard-letter sorting outputs are so small that they are only able to accommodate standard letters, and no large letters. Therefore the standard-letter sorting outputs occupy significantly less space (footprint) than a set of universal sorting outputs. The dimensions of the standard-letter sorting outputs determine which of the mail items to be sorted are treated as standard letters, and which are treated as large letters.

In a preferred embodiment, as indicated in FIG. 1, the standard-letter sorting outputs are arranged in two rows, one above the other. A further embodiment variant even provides for two rows of standard-letter sorting outputs to be arranged back-to-back on each level, such that half of the standard-letter sorting outputs are accessible from one side and the other half is accessible from the other side.

Every large-letter sorting output is able to accommodate a plurality of mail items in each case, in particular any large letter up to a prescribed maximal size and also any standard letter. A large-letter sorting output therefore occupies more space than a standard-letter sorting output. The e.g. 45 to 70 large-letter sorting outputs are preferably arranged on a single level and specifically such that external access is both easy and ergonomic.

In an embodiment variant, a large-letter sorting output is likewise designed as a compartment and is able to accommodate a stack of flat mail items. In a further embodiment variant, a large-letter sorting output comprises an exchangeable container and a storage location for such a container. A stack of horizontal mail items is generated in this container during the course of sorting. The selection unit AE selects a large-letter sorting output by selecting an outward-transfer position above this container or even alongside this container. The mail item is transported to this selected outward-transfer position and then released. The released mail item slides from this outward-transfer position from above into the container, which is open at the top, or is pushed sideways into the container. The container stands either on a stationary support surface beneath the outward-transfer position or on a specific section of a horizontal conveyor belt which carries full containers away. In an embodiment variant, empty containers are also brought on this horizontal conveyor belt.

In the exemplary embodiment, each outward-transfer device Aus.1, Aus.2 has a main transport path and one outward-transfer component for each sorting output, e.g. an outward-transfer separating filter. The outward-transfer component of a selected sorting output directs a mail item from the main transport path into this selected sorting output.

The system of transport devices and the outward-transfer devices Aus.1, Aus.2 comprise a system of continuous conveyor belts and other conveyor elements. Each continuous conveyor belt is guided around at least two rollers or shafts, which can rotate about vertical axes of rotation. A roller is driven in a controlled manner. A mail item is clamped between two continuous conveyor belts in each case and transported in an upright manner. At least one light barrier measures whether a light beam of the light barrier is interrupted by a mail item. This light beam is transmitted through a gap between two continuous conveyor belts. The current position of each mail item can be determined from the signals of the at least one light barrier and the known or measured transport speed.

The first transport device TE.1 is arranged immediately downstream of the feeder device ZE or feeder devices. In the case of multiple parallel feeder devices, all feeder devices flow into the first transport device TE.1. The first transport device TE.1 transports both the singulated large letters and the singulated standard letters between the two cameras Ka.1, Ka.2 and onwards to the input of the separating filter W.1. The automatic decision as to whether the mail item is a standard letter or a large letter has been made by the time the mail item reaches the separating filter W.1 at the latest. The second transport device TE.2 for standard letters starts at one output of the separating filter W.1, while the large-letter outward-transfer device Aus.1 for large letters starts at the other output. The separating filter W.1 redirects a standard letter into the second transport device TE.2 and a large letter to the large-letter outward-transfer device Aus.2. In the exemplary embodiment, a large letter is guided around a large roller which sits on a vertical shaft, and is fed into the large-letter outward-transfer device Aus.1 after this 180° reversal of direction.

In an embodiment variant, the sorting output into which a mail item will be transferred out must be known when said mail item reaches an outward-transfer device Aus.1, Aus.2. Therefore the destination identification mark of a large letter must have been decoded when the large letter reaches the separating filter W.1. More time is available for determining the sorting feature value of a standard letter, i.e. additionally at least that time span in which the standard letter is transported along the second transport device TE.2.

The selection unit AE selects a large-letter sorting output for a large letter if the measurement result (the decoded destination identification mark in this case) is available when the large letter reaches the separating filter W.1, and otherwise selects a special sorting output. The large-letter sorting output which is selected by the selection unit AE depends on the decoding result. The destination identification marks of mail items which are transferred out into the or a special sorting output are then decoded by means of "off-line video coding", and these mail items are subsequently fed back into the sorting installation.

In a preferred embodiment variant, it is sufficient for the sorting feature value to be available in timely fashion before the mail item reaches the outward-transfer component of the sorting output into which the mail item is to be transferred out. More time is therefore available in this embodiment.

The separating filter W.1 redirects a standard letter into the second transport device TE.2. This second transport device TE.2 transports standard letters only, and can therefore be tailored to standard letters, particularly in respect of the design of the conveyor belts, rollers and other conveyor elements. The second transport device TE.2 is additionally designed as a "delay line" and has a meandering layout (cf. FIG. 1). The delay line transports a standard letter over an extended time period, during which it is firmly held at all times. In order to analyze the destination identification mark of a standard letter, the entire transport route is available from the cameras Ka.1, Ka.2 to the standard-letter outward-transfer device Aus.2. The meandering layout of this embodiment variant results in an extended transport time while the transport speed remains the same and the space requirement is modest. In an embodiment variant, the destination identification mark of a standard letter must have been decoded when the standard letter reaches the standard-letter outward-transfer device Aus.2. By virtue of the extended transport time, this is achieved for nearly all standard letters. In an embodiment variant, the sorting installation nonetheless has a special sorting output for standard letters whose destination identification mark could not be decoded in timely fashion.

In the preferred embodiment variant, time for determining the sorting feature value is still available while the standard letter is being transported by the standard-letter outward-transfer device Aus.2.

The selection unit AE selects a standard-letter sorting output or the special sorting output. The standard-letter outward-transfer device Aus.1 transfers the standard letter out into the selected standard-letter sorting output. This is performed consecutively for each standard letter, such that a stack of standard letters standing upright is produced in each standard-letter sorting output.

The danger of a large letter being damaged during the transport through the sorting installation is significantly greater than the danger of a standard letter being damaged, assuming the same transport distance via the same transport device at the same transport speed. The invention addresses this limiting condition by providing for all mail items (i.e. standard letters and large letters) to be transported via the first transport device TE.1 initially, and only the standard letters to be additionally transported via the second transport device TE.2.

The claimed sorting installation can be used for both dispatch sorting and receipt sorting. Every mail item on its route from the point of posting to its destination undergoes first dispatch sorting and then receipt sorting. Dispatch sorting relates to the sorting of all mail items which are posted within a specific time period within the service area of a sorting center. In the context of dispatch sorting, every sorting center represents a sorting destination. All mail items having destinations in the service area of a sorting center are transported to this destination sorting center after dispatch sorting.

Receipt sorting takes place in this destination sorting center. The mail items are distributed to the different delivery areas, for example, this being performed in the context of said receipt sorting. For each delivery area, it is also possible to prescribe a sequence of the destinations in this delivery area, and additionally to sort the mail items precisely into this sequence ("delivery sequence") after the receipt sorting. There are significantly more sorting destinations in the receipt sorting and the subsequent sequence sorting than in the dispatch sorting.

In an embodiment variant, in the context of dispatch sorting and receipt sorting, the claimed sorting installation performs a single sorting run for all mail items to be sorted. This is possible if there are fewer different sorting destinations than there are large-letter sorting outputs in the sorting installation and also fewer different sorting destinations than there are standard-letter sorting outputs in the sorting installation. In the context of sequence sorting, however, there are more sorting destinations than there are large-letter sorting outputs in the sorting installation. The sorting installation therefore performs two or even three sorting runs, at least for the large letters, in order to arrange the large letters in a sequence. Upon completion of the last sorting run, a stack of sorted large letters has been created in each large-letter sorting output. The large letters having the same sorting feature value ("destination identification mark") are so arranged as to appear one directly behind the other in this stack. The order in which large letters having different sorting feature values appear in this stack depends on a prescribed sequence of sorting feature values.

One possible sorting method for the sequence sorting requires that the large letter sorting installation be emptied in a prescribed sequence ("refeed sequence") after each sorting run except the last. The mail items from the large-letter sorting outputs are fed back to the feeder device ZE in a prescribed feed sequence. For example, provision is made for performing a “radix sort” in which two sorting runs are performed consecutively and a “refeed sequence” is observed.

The sorting installation preferably has more standard-letter sorting outputs than large-letter sorting outputs. In an embodiment variant, there are at least as many standard-letter sorting outputs as there are different sorting feature values for a sorting task. The standard letters are therefore distributed to the standard-letter sorting outputs in a single sorting run. Provision is preferably made for performing a sorting run for large letters and standard letters and a subsequent second sorting run for the large letters only. This second sorting run can be so performed for further mail items as to temporally overlap a first sorting run.

In a further embodiment variant, two sorting runs are also performed for the standard letters. A different sorting algorithm can be applied to the standard letters than that which is applied to the large letters, e.g. a “tree sort”. In the “tree sort”, the set of sorting feature values which occur is broken down into groups, such that each sorting feature value belongs to precisely one group. Each group is assigned a sorting output. The standard letters are allocated to the groups in the first sorting run, i.e. for each standard letter the selection unit AE selects that standard-letter sorting output to which the group of the sorting feature value is assigned. In the second sorting run, the mail items of a respective group are consecutively distributed to the sorting outputs. A specific feed sequence need not be observed after the first sorting run.

The sorting installation can be adapted to these different sorting tasks by merely applying different sorting plans, i.e. by means of software changes alone. It is not necessary to modify the hardware of the sorting installation.

As explained above, each mail item passes through a sorting installation twice, i.e. once during the dispatch sorting and once during the receipt sorting. It is possible for a mail item to pass through the same sorting installation twice in each case. In an embodiment variant, a machine-readable encoding for the decoded destination identification mark is printed onto each mail item during the first sorting run, e.g. in the form of a barcode (“sorting barcode”). The claimed sorting installation has a printer Dr.1, which prints a barcode onto a large letter, and further printer Dr.2, which prints a barcode onto a standard letter. In this embodiment variant, the decoding result must be available before a large letter reaches the printer Dr.1 and before a standard letter reaches the printer Dr.2. In a variation, the sorting installation only has one printer Dr.2 for standard letters. A large letter is identified on the basis of the values of a plurality of features which can be captured optically. Such a method is said to make use of a “fingerprint” or “virtual ID”.

In a development of this embodiment variant, each printer Dr.1, Dr.2 is also able to print a unique identifier (“identifier barcode”) on a mail item instead of a “sorting barcode” for the sorting feature value which has been determined. If a mail item reaches a printer Dr.1, Dr.2 but the sorting feature value of this mail item is not available at this time point, the printer Dr.1, Dr.2 prints a unique identifier onto the mail item. The mail item is transferred out into a special sorting output. The sorting feature value (destination identification mark in this case) is determined by means of “off-line video coding”. This sorting feature value is stored together with the identifier in a database. In a subsequent sorting run, a barcode scanner BCS.1, BCS.2 reads the identifier, and the stored sorting feature value is determined by means of a search request and used in this subsequent sorting run.

In a further embodiment variant, the sorting installation has only a single printer, this being arranged upstream of the separating filter W.1. The sorting feature value of a mail item to be sorted is only considered to be available in timely fashion if the sorting feature value has been determined when this mail item reaches said single printer.

The separating filter W.2 is so designed as to either leave a standard letter in the second transport device TE.2 or direct it into the further transport device TE.w. The further transport device TE.w leads to the large-letter outward-transfer device Aus.1 and, at the joining point Ein, joins the large-letter outward-transfer device Aus.1 or the first transport device TE.1 such that, upstream of the first large-letter sorting output, the further transport device TE.w transports a standard letter back to the first transport device TE.1.

This further transport device TE.w is used for e.g. the following transport tasks:

- Only the large-letter outward-transfer device Aus.1, and not the standard-letter outward-transfer device Aus.2, is able to transfer a mail item out into a special sorting output. Therefore if the delivery point identification mark of a standard letter cannot be decoded in timely fashion, this standard letter is transported back to the large-letter outward-transfer device Aus.1 via the further transport device TE.w.
- Only one large-letter sorting output, and no standard-letter sorting output, is assigned in each case to some or even all sorting feature values. For example, some or even all standard-letter sorting outputs are occasionally unavailable because they are being maintained or repaired or used for another sorting task. At least one stack comprising a mixture of large letters and standard letters is therefore produced in at least one large-letter sorting output.

In an embodiment variant, the mail items are separated into large letters and standard letters in advance. The large letters pass through the sorting installation first, followed by the standard letters, or vice versa. This embodiment variant allows the further transport device TE.w to be used as described above, without having to create a stream of separate mail items comprising a mixture of large letters and standard letters (“merging”) at the joining point.

In order to switch the sorting installation from the previously described configuration to the configuration described immediately above, it is again only necessary to adapt sorting plans. The hardware of the sorting installation need not be modified.

List of reference signs

| Reference sign | Meaning |
|---|---|
| AE | Selection unit: automatically selects a sorting output for each mail item |
| Aus.1 | Outward-transfer device for large letters: supplies the large-letter sorting outputs |
| Aus.2 | Outward-transfer device for standard letters: supplies the standard-letter sorting outputs |
| BAE | Image analysis unit |
| BCS.1, BCS.2 | Barcode scanners |
| Dr.1 | Printer which imprints the large letters |
| Dr.2 | Printer which imprints the standard letters |
| Ein | Joining point at which the further transport device TE.w joins the large-letter outward-transfer device Aus.1 |
| Ka.1, Ka.2 | Cameras which generate a computer-analyzable image of a mail item in each case |

-continued

List of reference signs

| Reference sign | Meaning |
|---|---|
| SE | Control unit: controls inter alia the separating filters W.1, W.2 and the outward-transfer devices Aus.1, Aus.2 |
| SM.1 | Set of standard-letter sorting outputs distributed over multiple levels |
| SM.2 | Set of large-letter sorting outputs arranged on one level |
| St | Stack comprising large letters and standard letters for singulation |
| TE.1 | First transport device: transports large letters and standard letters, and leads from the feeder device ZE to the separating filter W.1 |
| TE.2 | Second transport device: transports only standard letters, and leads from the separating filter W.1 to the second outward-transfer device Aus.2 |
| TE.w | Further transport device: leads from the second transport device TE.2 to the first outward-transfer device Aus.1 |
| Ver | Singulator |
| W.1 | Separating filter which directs a mail item to either the first outward-transfer device Aus.1 or the second transport device TE.2 |
| W.2 | Separating filter which either leaves a mail item in the second transport device TE.2 or redirects it to the further transport device TE.w |
| ZE | Feeder device including the singulator Ver |

The invention claimed is:

1. A sorting installation for sorting articles in accordance with a prescribed sorting feature, wherein each article to be sorted belongs to either a first article kind or a second article kind, the sorting installation comprising:

a measuring device;

a data-processing selection unit;

a first transport device;

a second transport device;

a separating filter having a first output and a second output;

a first outward-transfer device;

a second outward-transfer device;

a first set of sorting outputs; and a second set of sorting outputs;

each of said sorting outputs of said first set of sorting outputs is able to accommodate at least one article of the first article kind in each case, each of said sorting outputs of said second set of sorting outputs is able to accommodate at least one article of the second article kind in each case;

said first outward-transfer device starts at said first output of said separating filter and said second transport device starts at said second output of said separating filter;

said measuring device automatically determines a sorting feature value assumed by the prescribed sorting feature for the article to be sorted;

said selection unit selects, in dependence on the sorting feature value of the article, a respective sorting output for each of the articles to be sorted;

said first transport device transporting each of the articles to be sorted to said separating filter;

said second transport device transporting each of the articles to be sorted belonging to the second article kind from said separating filter to said second outward-transfer device;

each of said first and second outward-transfer devices is configured so that the article which is to be sorted and has been transported to a respective said first or second outward-transfer device is:

transported to a selected said sorting output; and transferred out into said sorting output selected;

the sorting installation being configured to perform the following steps for each of the articles to be sorted, wherein:

said measuring device determines the sorting feature value assumed by the prescribed sorting feature for the article;

said measuring device establishes whether the article belongs to the first article kind or the second article kind; and said first transport device transports the article to said separating filter;

the sorting installation configured to perform steps for each of the articles to be sorted belonging to the first article kind, wherein:

if said measuring device has determined the sorting feature value in a given time, said selection unit selects a sorting output of said first set of sorting outputs in dependence on the sorting feature value which has been determined;

if said separating filter forwards the article to said first outward-transfer device, said first outward-transfer device transfers the article out into said sorting output selected;

the sorting installation configured to perform steps for each of the articles to be sorted belonging to the second article kind, wherein:

the second transport device transports the article onwards, if said measuring device has determined the sorting feature value in a given time, said selection unit selecting a sorting output in dependence on the sorting feature value which has been determined;

if said sorting output selected belongs to said second set of sorting outputs, said second transport device transports the article to said second outward-transfer device and said second outward-transfer device transfers the article out into said sorting output selected.

2. The sorting installation according to claim 1, wherein:

said measuring device determines the sorting feature value of the article of the first article kind in the given time at least if said measuring device has determined the sorting feature value of the article at a latest when the article reaches said first outward-transfer device, and said measuring device determines the sorting feature value of the article of the second article kind in the given time at least if said measuring device has determined the sorting feature value at a latest when the article reaches said second outward-transfer device.

3. The sorting installation according to claim 1, wherein said measuring device has determined the sorting feature value of the article in the given time at least if said measuring device has determined the sorting feature value sufficiently early that said selection unit is able to select said sorting output before said first or second outward-transfer device has completed a transport of the article to said sorting output selected.

4. The sorting installation according to claim 1, further comprising at least one special sorting output, and the sorting installation is configured such that the article to be sorted is transferred out into said special sorting output if said measuring device has not determined the sorting feature value in the given time.

5. The sorting installation according to claim 1, wherein said first set of sorting outputs has fewer said sorting outputs than said second set of sorting outputs.

6. The sorting installation according to claim 1, further comprising a further transport device configured to transport the article to be sorted from said second transport device to said first outward-transfer device, at least one of said sorting outputs of said first set of sorting outputs is able to accommodate at least one article of the second article kind, the sorting installation can be operated in a mode in which the sorting installation is so configured as to perform the steps wherein:

in respect of an article of the second article kind said selection unit selects either said sorting output of said second set of sorting outputs or said sorting output which belongs to said first set of sorting outputs and is suitable for accommodating the article of the second article kind;

if said selection unit has selected said sorting output of said first set of sorting outputs for the article to be sorted belonging to the second article kind, the sorting installation transports the article from said first transport device, said second transport device and said further transport device to said first outward-transfer device; and said first outward-transfer device transfers the article out into said sorting output selected.

7. The sorting installation according to claim 6, further comprising a special sorting output and the sorting installation is configured so that:

if said measuring device has not determined the sorting feature value of the article of the second article kind in the given time, the article is transported to said first outward-transfer device via said further transport device and is transferred out into said special sorting output by means of said first outward-transfer device.

8. The sorting installation according to claim 1, wherein every said sorting output of said first set of sorting outputs is able to accommodate any of the articles to be sorted belonging to the first article kind and any of the articles to be sorted belonging to the second article kind, and every said sorting output of said second set of articles is able to accommodate any of the articles to be sorted belonging to the second article kind.

9. The sorting installation according to claim 1, wherein a sequence is prescribed in respect of sorting feature values that occur, and the sorting installation is moreover so configured as to create, in said sorting outputs of said second set of sorting outputs, a series of the articles which are to be sorted and belong to the second article kind, such that the sequence of the articles in the series corresponds to the prescribed value sequence, wherein the sorting installation generates a series of articles, sorted according to the value sequence, in each selectable said sorting output of said second set of sorting outputs.

10. The sorting installation according to claim 1, wherein said sorting outputs of said second set of sorting outputs are distributed over at least two levels.

11. A sorting method for sorting a plurality of articles in accordance with a prescribed sorting feature, wherein each article to be sorted belongs to either a first article kind or a second article kind, which comprises the steps of:

providing a sorting installation for sorting, the sorting installation containing:
- a first transport device;
- a second transport device;
- a separating filter having at least two outputs;

- a first outward-transfer device;
- a second outward-transfer device;
- a first set of sorting outputs; and
- a second set of sorting outputs;

determining a sorting feature value assumed by the prescribed sorting feature for the article;

determining whether the article belongs to the first article kind or the second article kind;

transporting the article to the separating filter by means of the first transport device;

performing the following additionally steps for each article of the first article kind:

directing the article into the first outward-transfer device by means of the separating filter;

if the sorting feature value for the article has been determined in a given time, automatically selecting a sorting output from the first set of sorting outputs in dependence on the sorting feature value;

transferring the article out into the sorting output selected of the first set of sorting outputs by means of the first outward-transfer device;

performing the following additional steps for each article of the second article kind:

redirecting the article into the second transport device by means of the separating filter;

transporting the article onwards by means of the second transport device;

if the sorting feature value for the article has been determined in a given time, selecting a sorting output in dependence on the sorting feature value which has been determined; and if a sorting output of the second set of sorting outputs has been selected for the article, transporting the article to the second outward-transfer device by means of the second transport device, and transferring the article out into the sorting output selected of the second set of sorting outputs by means of the second outward-transfer device.

12. The sorting method according to claim 11, which further comprises:

providing the sorting installation with a further transport device;

switching the sorting installation at least once into an isolation mode and at least once into a mixing mode;

if the sorting feature value is determined in the given time in the isolation mode, selecting the sorting output of the second set of sorting outputs for each article of the second article kind;

if the sorting feature value is determined in the given time in the mixing mode, selecting either the sorting output of the first set of sorting outputs or the sorting output of the second set of sorting outputs for each article of the second article kind; and in the mixing mode, if a sorting output of the first set of sorting outputs is selected for the article to be sorted, transporting the article of the second article kind by means of the second transport device and the further transport device to the first outward-transfer device and is transferred out into the sorting output selected of the first set of sorting outputs by the first outward-transfer device.

13. The sorting method according to claim 11, wherein if a sorting output of the first set of sorting outputs has been selected for the article of the second article kind, transporting the article to the first outward-transfer device by means of the second transport device and the first outward-transfer device transfers the article out into the sorting output selected of the first set of sorting outputs.

* * * * *